US008549540B1

(12) United States Patent
Dixon et al.

(10) Patent No.: US 8,549,540 B1
(45) Date of Patent: Oct. 1, 2013

(54) MESSAGE QUEUE TRANSACTION TRACKING USING APPLICATION ACTIVITY TRACE DATA

(75) Inventors: Scot Dixon, South Perth (AU); Simon Teverey Huband, Carlisle (AU); Luke Rowan McKenna, Willetton (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/537,043

(22) Filed: Jun. 28, 2012

(51) Int. Cl.
*G06F 3/00* (2006.01)

(52) U.S. Cl.
USPC .......................................... 719/314; 719/318

(58) Field of Classification Search
None
See application file for complete search history.

(56) References Cited

U.S. PATENT DOCUMENTS

| 7,035,852 | B2 | 4/2006 | Hopewell et al. ..................... 1/1 |
| 7,454,478 | B1 | 11/2008 | Rosselli et al. ............... 709/214 |
| 7,716,652 | B2 | 5/2010 | Smith et al. ................... 717/130 |
| 2007/0143795 | A1 | 6/2007 | Tran ................................ 725/46 |
| 2009/0070780 | A1* | 3/2009 | Dinh et al. ..................... 719/314 |
| 2010/0241732 | A1* | 9/2010 | del Valle Lopez ............ 709/219 |
| 2011/0035724 | A1 | 2/2011 | Kettley et al. ................. 717/106 |
| 2011/0238861 | A1* | 9/2011 | Hutchinson ................... 709/238 |

OTHER PUBLICATIONS

"REME-D: A Reflective Epidemic Message—Oriented Debugger for Ambient-Oriented Applications", Boix, 2011, pp. 1-7.*
"Automatic detection of internal queues and stages in message processing system", Karumuri, 2009, pp. 1-2.*
"Hermes: A scalable event-bsed middleware", Pietzuch, 2004, pp. 1-180.*

* cited by examiner

*Primary Examiner* — Tuan Dao
(74) *Attorney, Agent, or Firm* — VanLeeuwen & VanLeeuwen; Diana R. Gerhardt

(57) ABSTRACT

An approach is provided that detects inbound messages being put to message queues managed by a middleware message queuing platform. The approach retrieves activity trace data corresponding to each of the inbound messages, with the activity trace data maintained by the middleware message queuing platform. The approach generates inbound event records corresponding the inbound messages based on the activity trace data. The approach then detects outbound messages retrieved from the message queues. Activity trace data corresponding to the outbound messages is retrieved and the approach generates an outbound event record for each outbound message. The approach receives a transaction request from a requestor that corresponds to a message. The approach retrieves and returns the inbound event records and outbound event records that correspond to the requested message. The retrieved event records are used for transaction tracking: to build transaction flow topologies and to report transaction performance metrics.

16 Claims, 9 Drawing Sheets

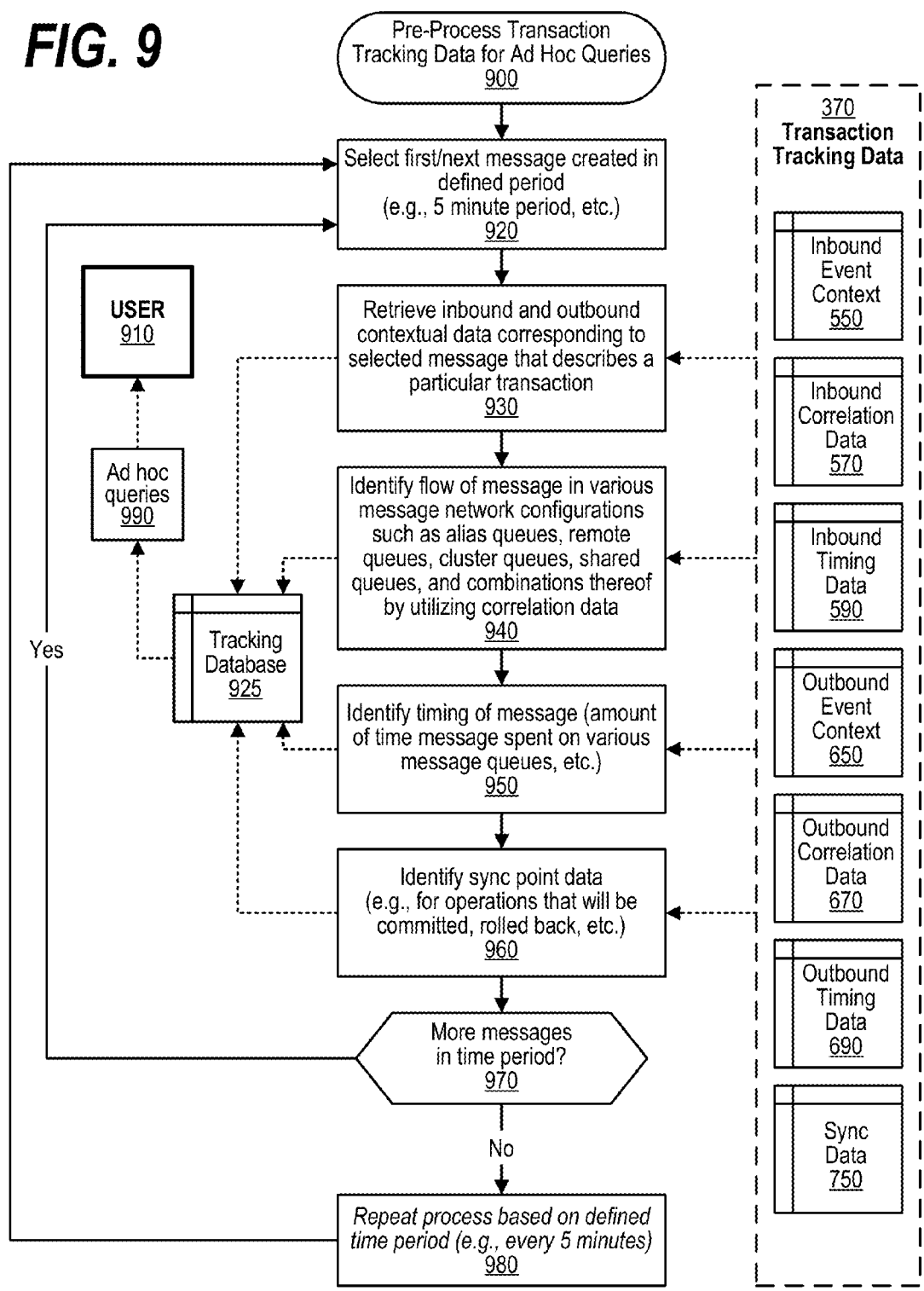

MESSAGE QUEUE TRANSACTION TRACKING USING APPLICATION ACTIVITY TRACE DATA

TECHNICAL FIELD

The present disclosure relates to an approach that tracks transactions through a middleware message queue environment by using application activity trace data.

BACKGROUND OF THE INVENTION

Middleware message queues, such as WebSphere® MQ, are message queuing technologies that allow users to create, pass, and consume messages programmatically in a networked environment independent of the underlying network topology or protocols. Transaction tracking technologies monitor application activity and transaction flows in order to determine transaction topologies and transaction performance metrics. To perform transaction tracking of middleware message queues, data describing applications' use of message queues and the underlying processes are collected. Traditionally, middleware message queues do not expose the data necessary for a complete or efficient transaction tracking solution. Consequently, transaction tracking agents are forced to construct a complete set of transaction tracking data from multiple inter-dependent monitoring points. Having incomplete data consequently forces multiple concessions from transaction tracking solutions, such as performance (multiple instrumentation points are required), accuracy (lost data causing subsequent transaction tracking failures), and the inability to dynamically enable/disable data collection (some level of monitoring is always required due to the inter-dependencies).

SUMMARY

An approach is provided that detects inbound messages being put to message queues managed by a middleware message queuing platform. The approach retrieves activity trace data corresponding to each of the inbound messages, with the activity trace data maintained by the middleware message queuing platform. The approach generates inbound event records corresponding the inbound messages based on the activity trace data. The approach then detects outbound messages retrieved from the message queues. Activity trace data corresponding to the outbound messages is retrieved and the approach generates an outbound event record for each outbound message based on the activity trace data. The approach receives a transaction request from a requestor that corresponds to a message. The approach retrieves and returns the inbound event records and outbound event records that correspond to the requested message. The retrieved event records are used for transaction tracking to build transaction flow topologies and to report transaction performance metrics.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 9 is a flowchart showing steps performed to preprocess the transaction tracking data to respond to ad hoc queries.

DETAILED DESCRIPTION

Figure 1:
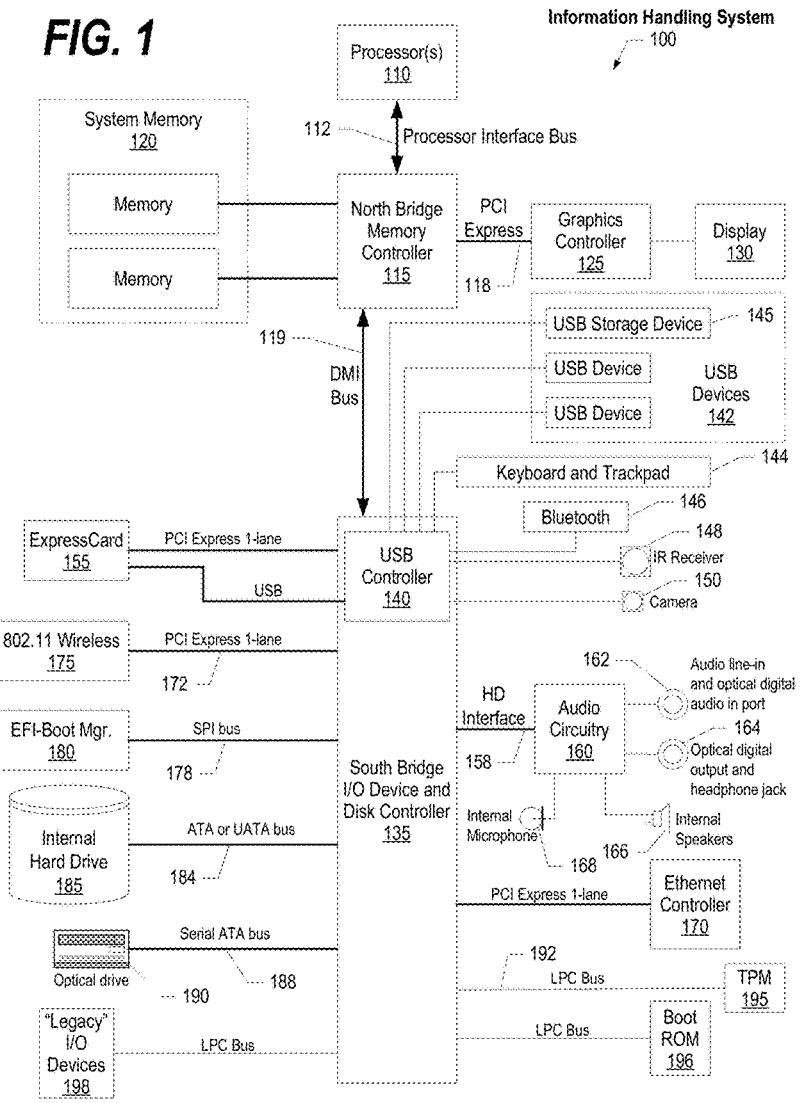
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
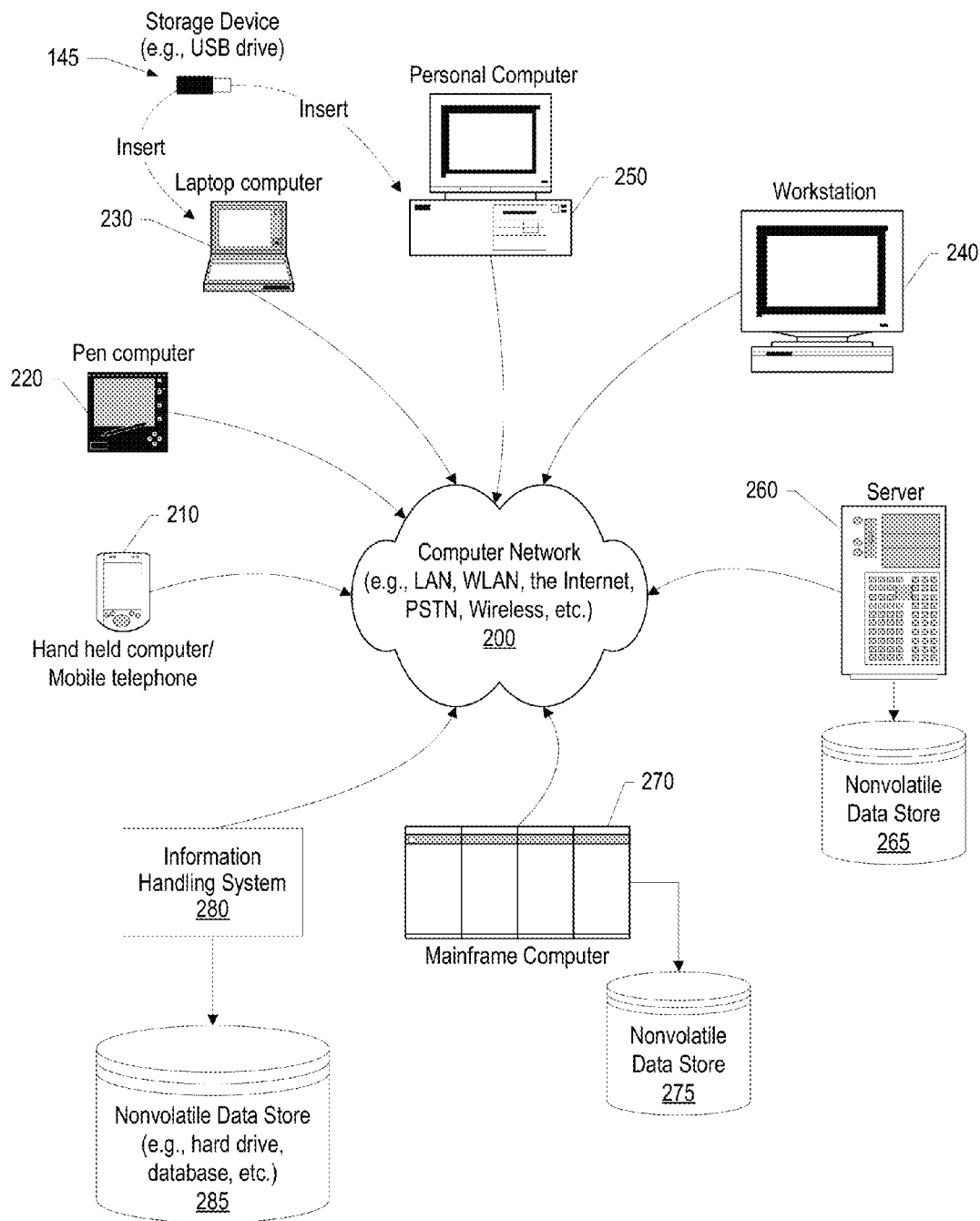
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
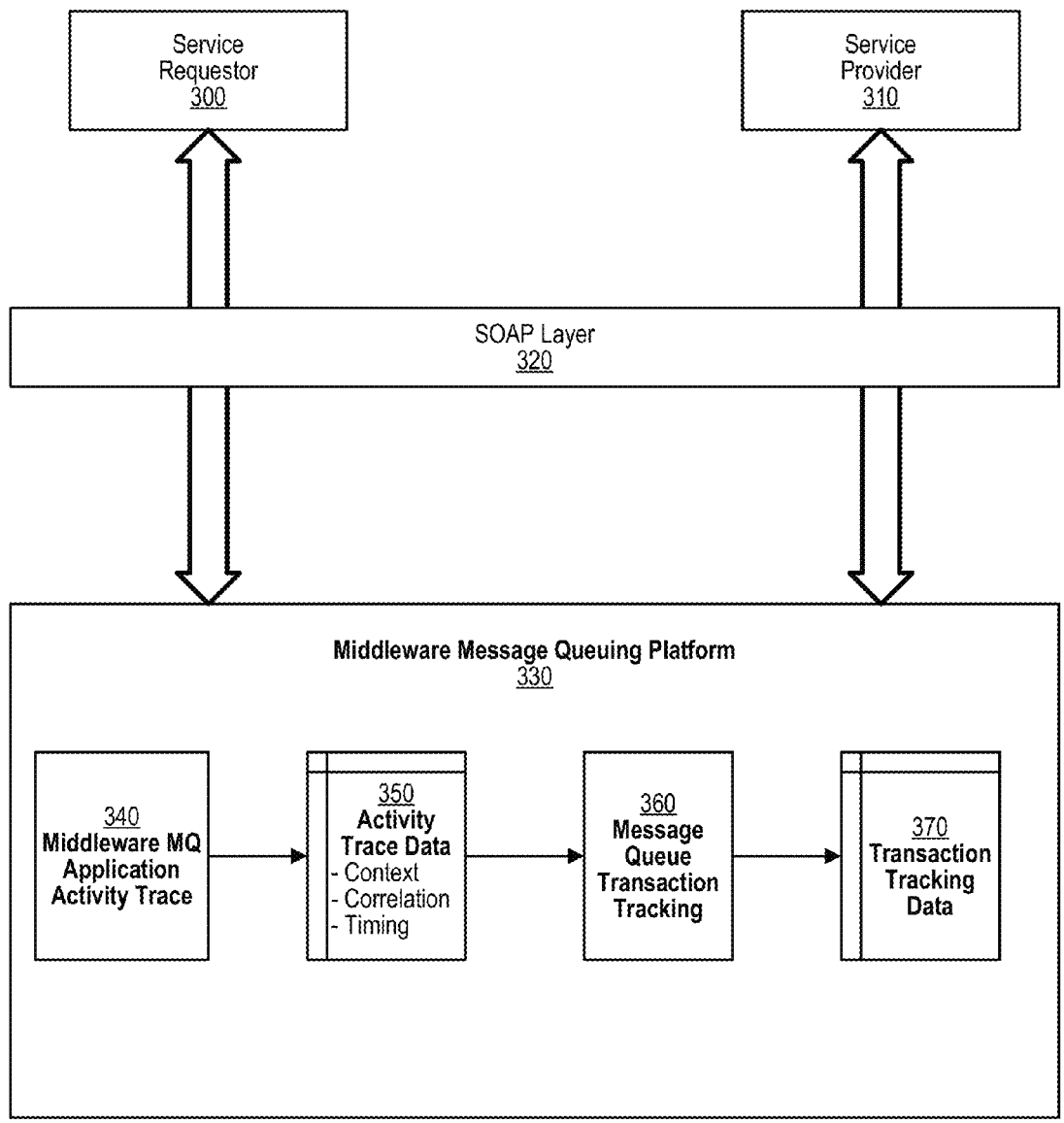
FIG. 3 is a component diagram depicting a middleware message queuing environment interacting with service requestors and providers.

FIG. 3 is a component diagram depicting a middleware message queuing environment interacting with service requestors and providers. SOAP Layer 320 (originally defined as Simple Object Access Protocol), is a protocol specification for exchanging structured information in the implementation of Web Services in computer networks. SOAP utilizes Extensible Markup Language (XML) for message formats, and usually relies on other Application Layer protocols, most notably Hypertext Transfer Protocol (HTTP) and Simple Mail Transfer Protocol (SMTP), for message negotiation and transmission. In the example shown, SOAP Layer 320 provides the exchange of messaging data between service requestor 300 and middleware message queuing platform 330. An example of a middleware message queuing platform is WebSphere® MQ which is a software offering of International Business Machines Corporation.

Middleware message queuing platform 330 is a message-oriented middleware software application. Middleware message queuing platform 330 allows independent and potentially non-concurrent applications on a distributed system to communicate with each other. For example, middleware message queuing platform 330 allows service requestor 300 and service provider 310 to communicate through messages managed by queues maintained by the middleware message queuing platform. Some of the processes middleware message queuing platform 330 executes to perform these services include processes 340 and 360.

Middleware message queuing platform 330 is a message queuing technology that allows processes to create, pass, and consume messages programmatically in a networked environment (e.g., the Internet, etc.) independent of the underlying network topology or protocols. Transaction tracking technologies (process 340) monitor application activity and transaction flows to determine transaction topologies and transaction performance metrics. To perform transaction tracking of middleware message queuing messages, the process collects data describing various applications' use of message queues and the underlying processes that support the transport of application messages within the middleware message queuing platform. Traditionally, middleware message queuing platforms did not expose data necessary for a complete or efficient transaction tracking solution. However, in the approach provided herein, middleware message queuing platform's process 340 gathers data that may be utilized for transaction tracking purposes and stores the data as application activity trace data in memory area 350. As further described in FIGS. 4-7, message queue transaction tracking process 360 consumes activity trace data and prepares transaction tracking data which is stored in memory area 370. FIGS. 8 and 9 show how the message queue transaction tracking process handles requests (e.g., from users, etc.) for transaction tracking data pertaining to particular messages managed by middleware message queuing platform 330.

Figure 4:
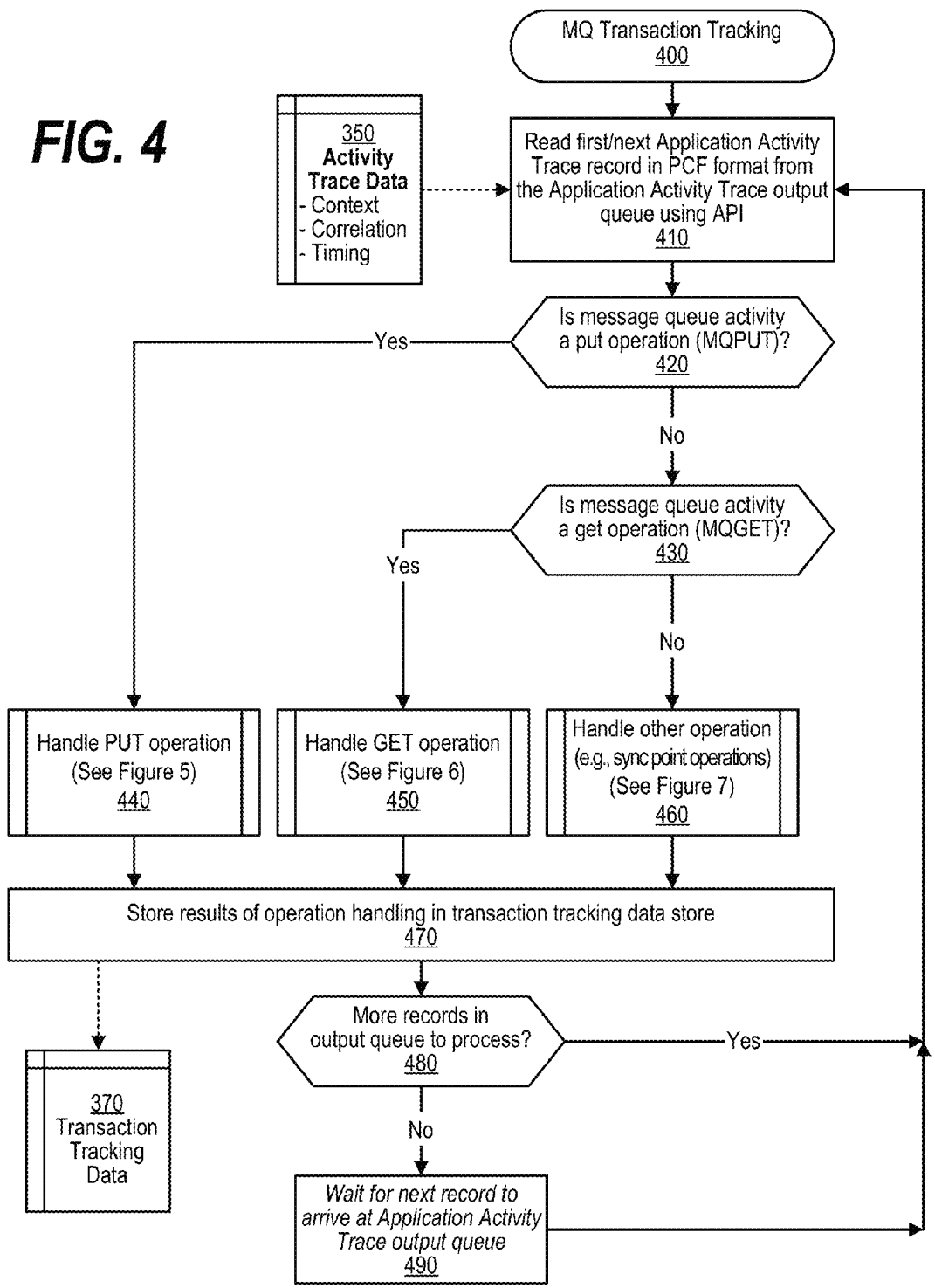
FIG. 4 is a flowchart showing steps taken to perform middleware message queue transaction tracking.

FIG. 4 is a flowchart showing steps taken to perform middleware message queue transaction tracking. Middleware message queuing transaction tracking processing commences at 400 whereupon, at step 410, the process reads the first Application Activity Trace record from Application Activity Trace Data memory area 350. As shown, Application Activity Trace Data includes context data pertaining to messages, correlation data pertaining to messages, and timing data pertaining to messages. At step 410, the process reads the data in a portable content format (PCF) using an application programming interface (API) provided by the middleware message queuing platform to read the Application Activity Trace Data.

The process determines whether the read message queue activity record pertains to a "put" operation (e.g., MQPUT, etc.) that was used to store (put) the data to the message queue (decision 420). If the message queue activity record read at step 410 pertains to a "put" operation, then the process branches to the "yes" branch whereupon, at predefined process 440, the process handles the PUT operation (see FIG. 5 and corresponding text for processing details).

On the other hand, if the message queue activity record read at step 410 does not pertain to a "put" operation, then decision 420 branches to the "no" branch. The process then determines whether the read message queue activity record pertains to a "get" operation (e.g., MQGET, etc.) that was used to retrieve (get) the data from the message queue (decision 430). If the message queue activity record read at step 410 pertains to a "get" operation, then the process branches to the "no" branch whereupon, at predefined process 450, the process handles the GET operation (see FIG. 6 and corresponding text for processing details). On the other hand, if the message queue activity record read at step 410 does not pertain to a "get" operation, then decision 420 branches to the "no" branch whereupon, at predefined process 460, the process handles other types of operations (see FIG. 7 and corresponding text for processing details).

After the process handles the record read at step 410 using either predefined process 440, predefined process 450, or predefined process 460, as described above, then, at step 470, the process stores the results of the operation handling in middleware message queuing transaction tracking data memory area 370. The process determines whether there are additional records queued in Application Activity Trace Data (memory area 350) to process as (decision 480). If there are additional records to process, then the process branches to the "yes" branch which loops back to read and process the next record as described above. If there are no more records to process at this time, then the process branches to the "no" branch whereupon, at step 490, the process waits for the next record and, when the next record arrives in queue 350, the process loops back to read and process the record as described above.

Figure 5:
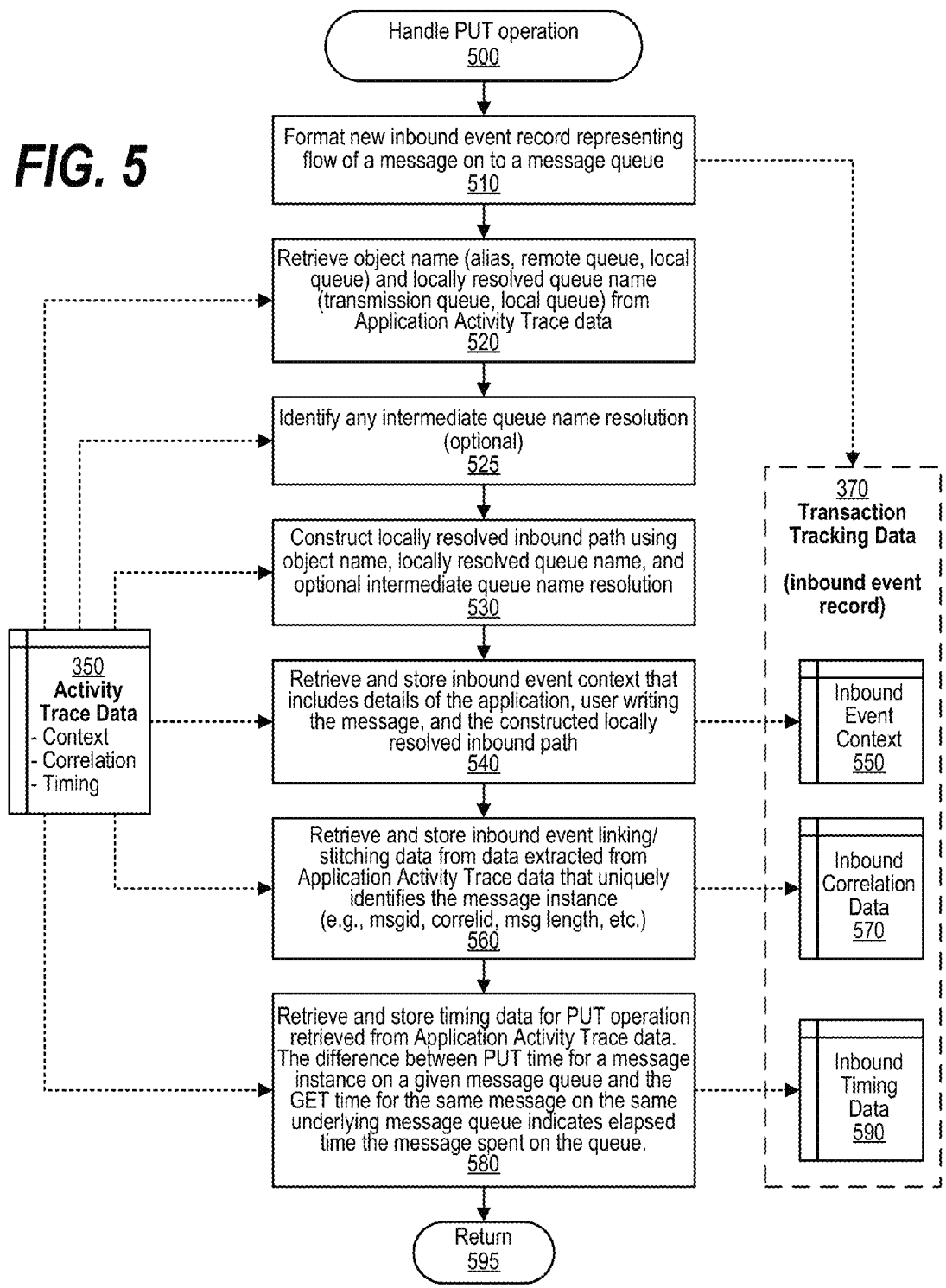
FIG. 5 is a flowchart showing steps taken to handle a PUT operation by the middleware message queue.

FIG. 5 is a flowchart showing steps taken to handle a PUT operation by the middleware message queue. PUT handling commences at 500 whereupon, at step 510, the process formats a new inbound event record (370) with the inbound event record representing the flow of a message being put onto a message queue. At step 520, the process retrieves the object name (e.g., alias, remote queue, local queue, etc.) and the locally resolved queue name (e.g., transmission queue, local queue, etc.) from Application Activity Trace Data memory area 350. At step 525, the process optionally identifies any intermediate queue name resolution used to put the message to a queue. At step 530, the process constructs a locally resolved inbound path by using the object name, the locally resolved queue name, and any optional intermediate queue name resolution. At step 540, the process retrieves inbound event context data from application trace data 350 and stores the event context data as part of the inbound event record stored in transaction tracking data 370 (inbound event context data 550). Inbound event context data 550 includes details of the application, an identifier of the user writing the message, and the constructed locally resolved inbound path.

At step 560, the process retrieves inbound event linking/stitching data from application trace data 350 and stores the event linking/stitching data as part of the inbound event record stored in transaction tracking data 370 (inbound correlation data 570). Inbound correlation data 550 includes data extracted from the Application Activity Trace data that uniquely identifies the message instance (e.g., msgid, correlid, msg length, etc.).

At step 580, the process retrieves timing data related to the PUT operation from Application Activity Trace Data 350 and stores the timing data as part of the inbound event record stored in transaction tracking data 370 (inbound timing data 590). The difference between the PUT time for a message instance on a given message queue and the GET time for the same message on the same underlying message queue indicates an elapsed time that the message spent on the queue. Processing then returns to the calling routine (see FIG. 4) at 595.

Figure 6:
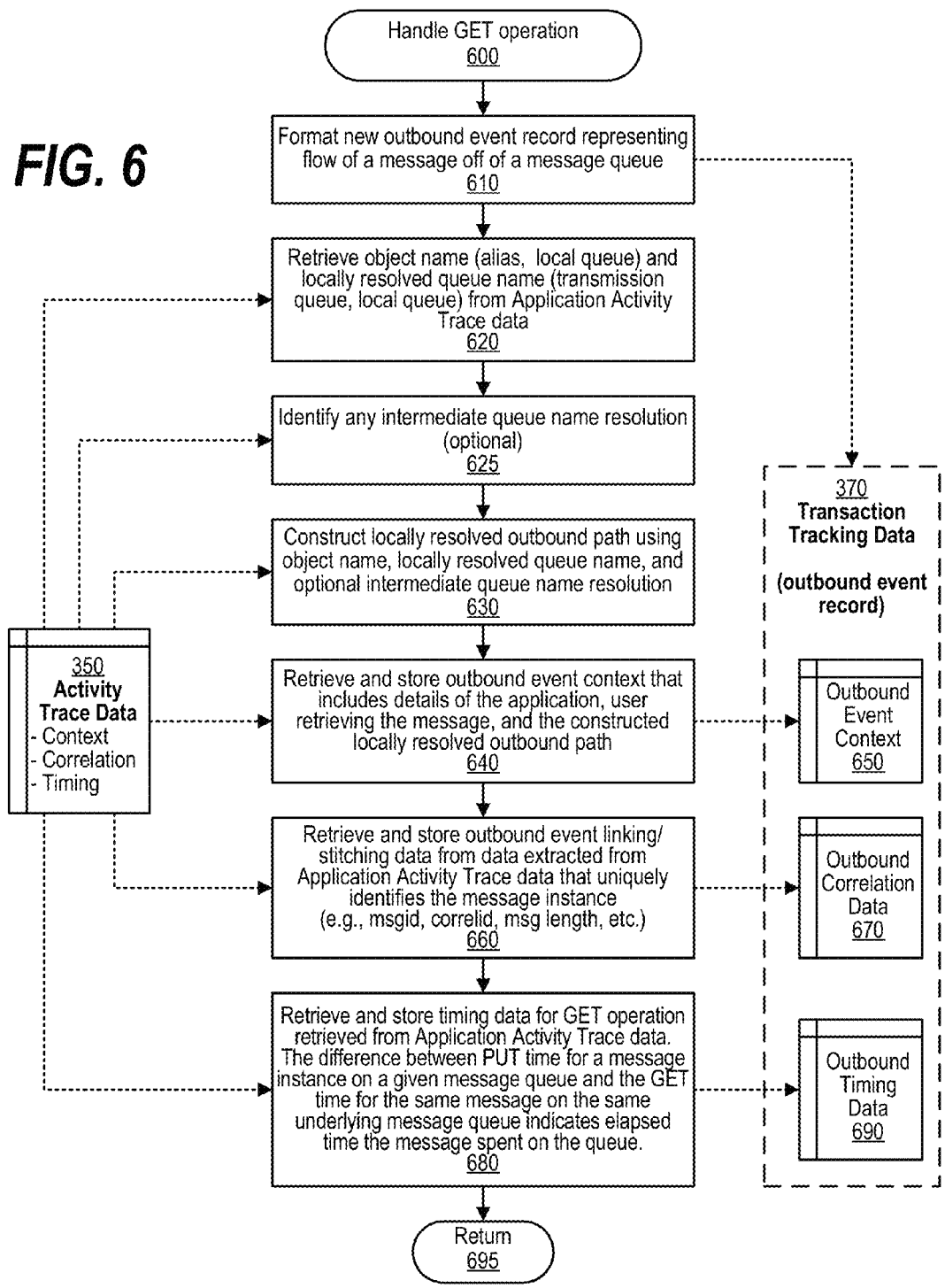
FIG. 6 is a flowchart showing steps taken to handle a GET operation by the middleware message queue.

FIG. 6 is a flowchart showing steps taken to handle a GET operation by the middleware message queue. PUT handling commences at 600 whereupon, at step 610, the process formats a new outbound event record (370) with the outbound event record representing the flow of a message being put onto a message queue. At step 620, the process retrieves the object name (e.g., alias, remote queue, local queue, etc.) and the locally resolved queue name (e.g., transmission queue, local queue, etc.) from Application Activity Trace Data memory area 350. At step 625, the process optionally identifies any intermediate queue name resolution used to put the message to a queue. At step 630, the process constructs a locally resolved outbound path by using the object name, the locally resolved queue name, and any optional intermediate queue name resolution. At step 640, the process retrieves outbound event context data from application trace data 350 and stores the event context data as part of the outbound event record stored in transaction tracking data 370 (outbound event context data 650). Outbound event context data 650 includes details of the application, an identifier of the user receiving the message, and the constructed locally resolved outbound path.

At step 660, the process retrieves outbound event linking/stitching data from application trace data 350 and stores the event linking/stitching data as part of the outbound event record stored in transaction tracking data 370 (outbound correlation data 670). Outbound correlation data 650 includes data extracted from the Application Activity Trace data that uniquely identifies the message instance (e.g., msgid, correlid, msg length, etc.).

At step 680, the process retrieves timing data related to the PUT operation from Application Activity Trace Data 350 and stores the timing data as part of the outbound event record stored in transaction tracking data 370 (outbound timing data 690). The difference between the GET time for a message instance on a given message queue and the PUT time for the same message on the same underlying message queue indicates an elapsed time that the message spent on the queue. Processing then returns to the calling routine (see FIG. 4) at 695.

Figure 7:
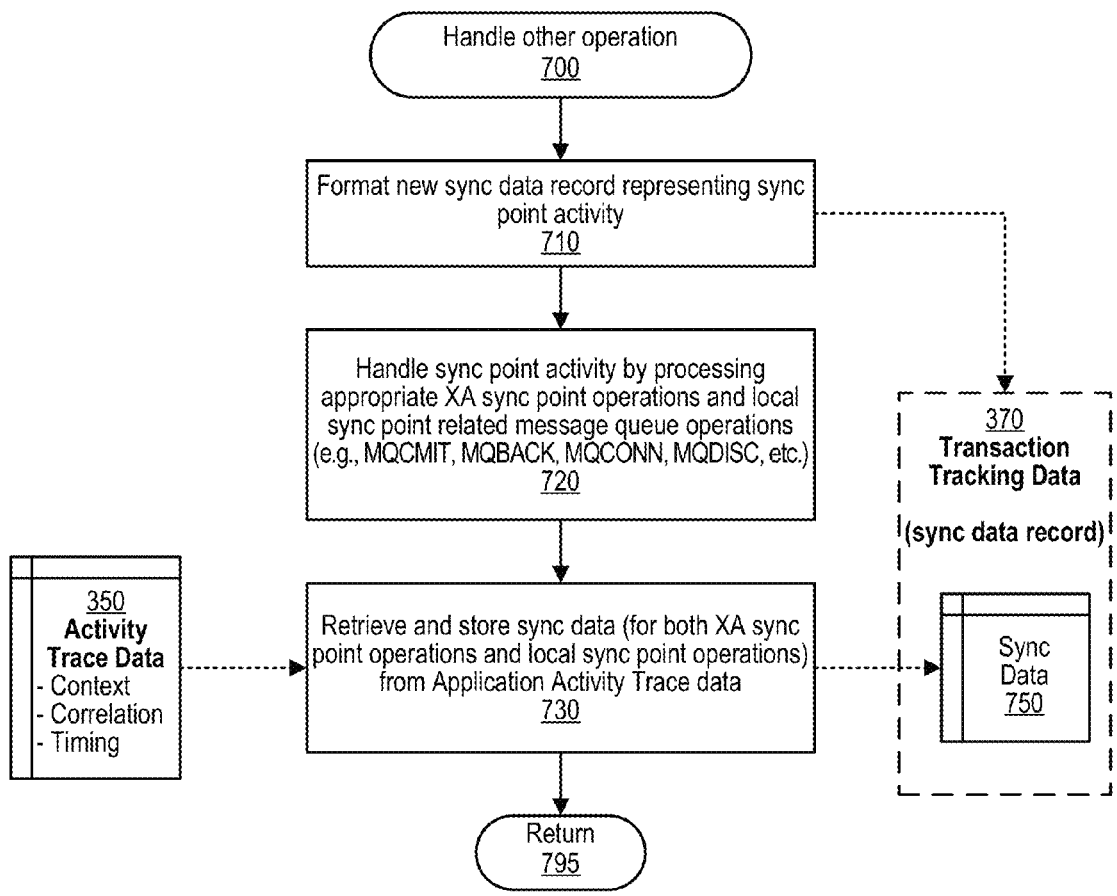
FIG. 7 is a flowchart showing steps taken to handle other operations by the middleware message queue.
Figure 8:
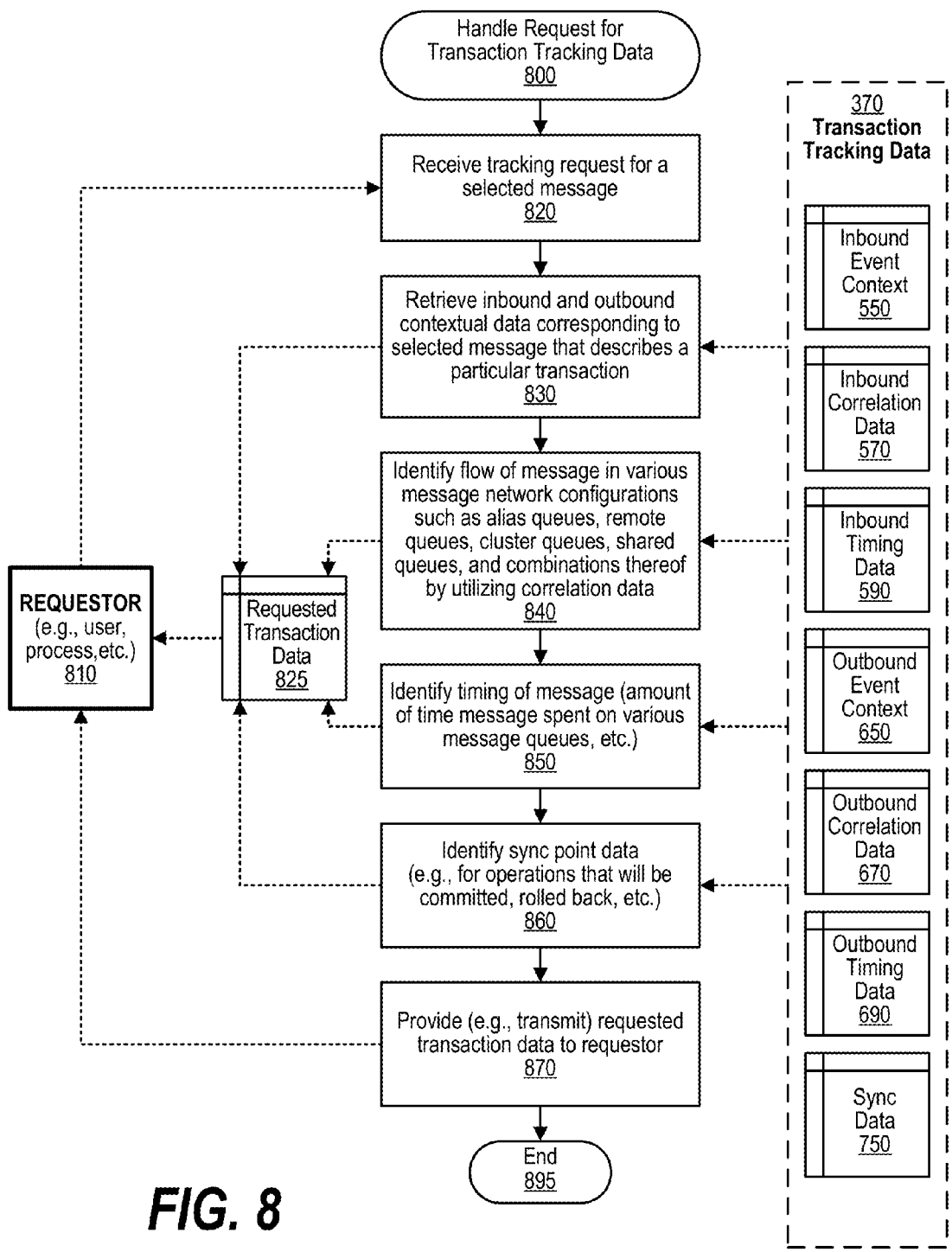
FIG. 8 is a flowchart showing steps performed to handle a request for transaction tracking data.

FIG. 7 is a flowchart showing steps taken to handle other operations by the middleware message queue. Processing commences at 700 whereupon, at step 700 the process formats a new sync data record (750) within transaction tracking data memory area 370. The sync data record represents sync point activity that pertains to a message. At step 720, the process handles sync point activity by processing appropriate XA sync point operations and local sync point related message queue operations (e.g., MQCMIT, MQBACK, MQCONN, MQDISC, etc.). At step 730, the process receives sync data (for both XA sync point operations and local sync point operations) from Application Activity Trace Data 350 and stores the retrieved sync data in sync data record 750. Processing then returns to the calling routine (see FIG. 4) at 795.

FIG. 8 is a flowchart showing steps performed to handle a request for transaction tracking data. Processing commences at 800 whereupon, at step 820, the process receives a tracking request from requestor 810. The tracking request pertains to a selected message managed by the middleware message queuing platform. Requestor 810 can be a user, another process, etc.

At step 830, the process retrieves inbound and outbound contextual data corresponding to the message selected by the requestor. The inbound and outbound contextual data describe a particular transaction. The data is retrieved from transaction tracking data 370 with the inbound contextual data being retrieved from memory area 550 within data 370 and with the outbound contextual data being retrieved from memory area 650 within data 370. At step 830, the process also stores the retrieved data into requested transaction data memory area 825.

At step 840, the process identifies the flow of the message through various message network configurations such as alias queues, remote queues, cluster queues, shared queues, and combinations thereof by utilizing correlation data. The correlation data is retrieved from transaction tracking data 370 with the inbound correlation data being retrieved from data area 570 and with the outbound correlation data being retrieved from data area 670. At step 840, the process also stores the retrieved data into requested transaction data memory area 825.

At step 850, the process identifies the timing of the selected message, such as the amount of time the message spent on various message queues, etc. The timing data is retrieved from transaction tracking data 370 with the inbound timing data being retrieved from data area 590 and with the outbound timing data being retrieved from data area 690. The process calculates a time difference between the inbound time included in the retrieved inbound timing data record and the outbound time included in the retrieved outbound timing data record, with the time difference being an elapsed time that the selected message was queued in one or more queues managed by the middleware message queuing platform. At step 850, the process also stores the retrieved data into requested transaction data memory area 825.

At step 860, the process identifies sync point data (e.g., for operations that will be committed, rolled back, etc.). The sync data is retrieved from transaction tracking data 370 (data area 750 within transaction tracking data 370). At step 860, the process also stores the retrieved data into requested transaction data memory area 825. At step 870, the process provides the retrieved data corresponding to the requestor's request to the requestor (e.g., transmits or provides requested transaction data 825 to requestor 810). The retrieved event records are used for transaction tracking to build transaction flow topologies and to report transaction performance metrics. Processing thereafter ends at 895.

FIG. 9 is a flowchart showing steps performed to pre-process the transaction tracking data to respond to ad hoc queries. Processing commences at 900 whereupon, at step 920, the process selects a first message that was created within a defined period (e.g., a five or ten minute period, etc.).

At step 930, the process retrieves inbound and outbound contextual data corresponding to the selected message. The inbound and outbound contextual data describe a particular transaction. The data is retrieved from transaction tracking data 370 with the inbound contextual data being retrieved from memory area 550 within data 370 and with the outbound contextual data being retrieved from memory area 650 within data 370. At step 930, the process also stores the retrieved data into transaction database 925.

At step 940, the process identifies the flow of the message through various message network configurations such as alias queues, remote queues, cluster queues, shared queues, and combinations thereof by utilizing correlation data. The correlation data is retrieved from transaction tracking data 370 with the inbound correlation data being retrieved from data area 570 and with the outbound correlation data being retrieved from data area 670. At step 940, the process also stores the retrieved data into transaction database 925.

At step 950, the process identifies the timing of the selected message, such as the amount of time the message spent on various message queues, etc. The timing data is retrieved from transaction tracking data 370 with the inbound timing data being retrieved from data area 590 and with the outbound timing data being retrieved from data area 690. The process calculates a time difference between the inbound time included in the retrieved inbound timing data record and the outbound time included in the retrieved outbound timing data record, with the time difference being an elapsed time that the selected message was queued in one or more queues managed by the middleware message queuing platform. At step 950, the process also stores the retrieved data into transaction database 925.

At step 960, the process identifies sync point data (e.g., for operations that will be committed, rolled back, etc.). The sync data is retrieved from transaction tracking data 370 (data area 750 within transaction tracking data 370). At step 960, the process also stores the retrieved data into transaction database 925.

The process determines whether there are more message that were received within the prescribed time period (decision 970). If there are more messages, then decision 970 branches to the "yes" branch which loops back to select and process the next message as described above. This looping continues until all of the message that fall within the defined period have been processed, at which point decision 970 branches to the "no" branch. At step 980, the process repeats the selection of messages as described above based on a defined time period (e.g., every five or ten minutes, etc.). When the process repeats, all of the messages within the time period are selected and processed as described above with the results being stored in tracking database 925.

User 910 performs ad hoc queries 990 against the data stored in tracking database 925. In this manner, the user can analyze particular messages or sets of messages to better understand the flow of messages through the middleware message queuing platform.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
    one or more processors;
    a memory coupled to at least one of the processors;
    a middleware message queuing platform executed by one or more of the processors; and
    a set of instructions stored in the memory and executed by at least one of the processors, wherein the set of instructions perform actions of:
        detecting a plurality of inbound messages being put to one or more message queues that are managed by the middleware message queuing platform;
        retrieving a first plurality of activity trace data corresponding to each of the plurality of inbound messages, wherein the activity trace data is maintained by the middleware message queuing platform;
        generating an inbound event record corresponding to each of the inbound messages based on the first plurality of activity trace data, wherein the generating further comprises storing an inbound event context corresponding to each of the inbound messages, wherein the inbound event context for each inbound message includes an application identifier and an identifier of a writer of the inbound message;
        detecting a plurality of outbound messages being retrieved from the one or more message queues;
        retrieving a second plurality of activity trace data corresponding to each of the plurality of outbound messages;
        generating an outbound event record corresponding to each of the outbound messages based on the second plurality of activity trace data;
        receiving, from a requestor, a transaction request corresponding to a selected message;
        retrieving transaction tracking data corresponding to the selected message by identifying one of the generated inbound event records that corresponds to the selected message and by identifying one of the generated outbound event records that corresponds to the selected message; and
        returning the retrieved transaction tracking data to the requestor.

2. The information handling system of claim 1 wherein the generating of the inbound event record further comprises:
    retrieving, from the first plurality of activity trace data, an object name and a locally resolved queue name corresponding to each of the inbound messages; and
    constructing, from the first plurality of activity trace data, a locally resolved inbound path corresponding to each of the inbound messages, wherein the locally resolved inbound path is based on the object name and a locally resolved queue name corresponding to each of the inbound messages.

3. The information handling system of claim 2 wherein the inbound event context for each inbound message further includes the constructed locally resolved inbound path.

4. The information handling system of claim 1 wherein the set of instructions performs additional actions comprising:
    generating an inbound timing data record corresponding to each of the inbound messages.

5. The information handling system of claim 4 wherein the set of instructions performs additional actions comprising:
    generating an outbound timing data record corresponding to each of the outbound messages.

6. The information handling system of claim 5 wherein the set of instructions performs additional actions comprising:
    retrieving the generated inbound and outbound timing data records corresponding to the selected message;
    calculating a time difference between an inbound time included in the retrieved inbound timing data record and an outbound time included in the retrieved outbound timing data record, wherein the time difference is an elapsed time that the selected message was queued; and returning the elapsed time to the requestor.

7. The information handling system of claim 1 wherein the set of instructions performs additional actions comprising:

generating an inbound correlation data record corresponding to each of the inbound messages, wherein the inbound correlation data includes event linking and stitching data corresponding to each of the inbound messages;

generating an outbound correlation data record corresponding to each of the outbound messages, wherein the outbound correlation data includes event linking and stitching data corresponding to each of the outbound messages;

retrieving the generated inbound and outbound correlation data records corresponding to the selected message;

identifying a flow of the selected message through the middleware message queuing platform; and returning identified flow of the selected message to the requestor.

8. The information handling system of claim 1 wherein the set of instructions performs additional actions comprising:

identifying sync point activity corresponding to one or more of the plurality of inbound messages;

generating a sync data record corresponding to each of the inbound messages with identified sync point activity;

retrieving the generated sync data record corresponding to the selected message; and returning the retrieved sync data record corresponding to the selected message to the requestor.

9. A computer program product stored in a computer readable memory, comprising computer instructions that, when executed by an information handling system, causes the information handling system to perform actions comprising:

detecting a plurality of inbound messages being put to one or more message queues that are managed by a middleware message queuing platform;

retrieving a first plurality of activity trace data corresponding to each of the plurality of inbound messages, wherein the activity trace data is maintained by the middleware message queuing platform;

generating an inbound event record corresponding to each of the inbound messages based on the first plurality of activity trace data, wherein the generating further comprises storing an inbound event context corresponding to each of the inbound messages, wherein the inbound event context for each inbound message includes an application identifier and an identifier of a writer of the inbound message;

detecting a plurality of outbound messages being retrieved from the one or more message queues;

retrieving a second plurality of activity trace data corresponding to each of the plurality of outbound messages;

generating an outbound event record corresponding to each of the outbound messages based on the second plurality of activity trace data;

receiving, from a requestor, a transaction request corresponding to a selected message;

retrieving transaction tracking data corresponding to the selected message by identifying one of the generated inbound event records that corresponds to the selected message and by identifying one of the generated outbound event records that corresponds to the selected message; and returning the retrieved transaction tracking data to the requestor.

10. The computer program product of claim 9 wherein the generating of the inbound event record further comprises:

retrieving, from the first plurality of activity trace data, an object name and a locally resolved queue name corresponding to each of the inbound messages; and constructing, from the first plurality of activity trace data, a locally resolved inbound path corresponding to each of the inbound messages, wherein the locally resolved inbound path is based on the object name and a locally resolved queue name corresponding to each of the inbound messages.

11. The computer program product of claim 10 wherein the inbound event context for each inbound message further includes the constructed locally resolved inbound path.

12. The computer program product of claim 9 wherein the actions further comprise:

generating an inbound timing data record corresponding to each of the inbound messages.

13. The computer program product of claim 12 wherein the actions further comprise:

generating an outbound timing data record corresponding to each of the outbound messages.

14. The computer program product of claim 13 wherein the actions further comprise:

retrieving the generated inbound and outbound timing data records corresponding to the selected message;

calculating a time difference between an inbound time included in the retrieved inbound timing data record and an outbound time included in the retrieved outbound timing data record, wherein the time difference is an elapsed time that the selected message was queued; and returning the elapsed time to the requestor.

15. The computer program product of claim 9 wherein the actions further comprise:

generating an inbound correlation data record corresponding to each of the inbound messages, wherein the inbound correlation data includes event linking and stitching data corresponding to each of the inbound messages;

generating an outbound correlation data record corresponding to each of the outbound messages, wherein the outbound correlation data includes event linking and stitching data corresponding to each of the outbound messages;

retrieving the generated inbound and outbound correlation data records corresponding to the selected message;

identifying a flow of the selected message through the middleware message queuing platform; and returning identified flow of the selected message to the requestor.

16. The computer program product of claim 9 wherein the actions further comprise:

identifying sync point activity corresponding to one or more of the plurality of inbound messages;

generating a sync data record corresponding to each of the inbound messages with identified sync point activity;

retrieving the generated sync data record corresponding to the selected message; and returning the retrieved sync data record corresponding to the selected message to the requestor.

* * * * *